July 14, 1964  M. McCOY  3,141,131
MEASURING INSTRUMENT USING A GLOW TUBE OPERATED
BELOW ITS IGNITION THRESHOLD
Filed Nov. 9, 1962

INVENTOR.
Marianne McCoy
BY *Max J. Lipkin*
ATTORNEY

United States Patent Office 3,141,131
Patented July 14, 1964

3,141,131
MEASURING INSTRUMENT USING A GLOW TUBE
OPERATED BELOW ITS IGNITION THRESHOLD
Marianne McCoy, 5209 N. University Ave., Peoria, Ill.
Filed Nov. 9, 1962, Ser. No. 237,441
2 Claims. (Cl. 324—96)

This invention relates to test instruments, and, more particularly, to instruments with extended ranges for the measurement of electrical parameters.

Since electricity first began to be used, instruments have been developed for measuring the values of the energy and of circuit components. However, even with constant improvement of electrical measuring instruments, other improvements in the utilization of the energy and its generation has always left even the latest developments in measuring and testing instruments wanting.

With the present emphasis on solid state devices such as transistors, masers, ferrite magnetic cores, and the like, more and more equipment, particularly in the communications, data processing and control fields, are operating with smaller and smaller currents. Instruments capable of accurately measuring high resistances and small leakage currents are in demand, particularly those instruments which are accurate and operate over wide ranges of values.

It is an object of this invention to provide new and improved measuring instruments.

It is another object of this invention to provide new and improved electrical measuring instruments.

It is a further object of this invention to provide new and improved electrical measuring instruments capable of measuring leakage currents of very small values and of measuring very high impedances and resistances.

Other objects and advantages of this invention will become obvious as the following description proceeds, which description should be considered together with the accompanying drawings in which.

Figure 1:
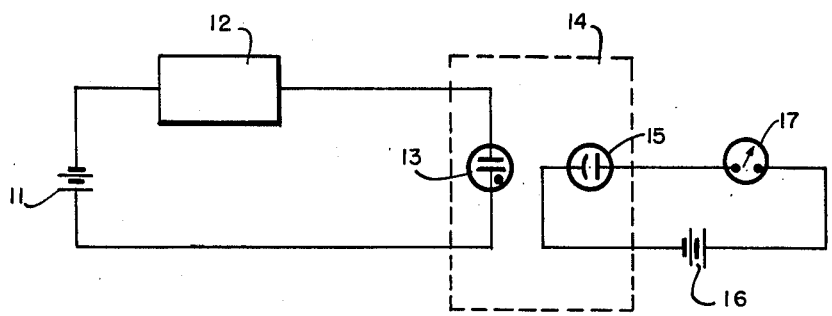
FIG. 1 is a schematic circuit diagram of the instrument according to this invention.

Referring now to the drawings in detail, and to FIG. 1 in particular, the reference character 11 designates a source of direct current such as a battery which provides electrical energy for testing a device 12 such as a resistance. A gas-filled glow tube 13 is connected in series with the battery 11 and the device 12 which is being tested. A housing 14 surrounds the glow tube 13 and a photoelectric cell 15 in light receiving relation with the glow tube 13. Connected to the photocell 15 is a battery 16 in series with a meter 17.

For a discussion of the operation of this device, assume that the device 12 being tested is a two-terminal electrical circuit with a very high resistance which is to be measured. When the device 12 is energized from the source 11, current flows therethrough. The amount of current flowing in the series circuit which includes the source 11, the device 12 and the glow tube 13 depends upon the output potential of the source 11 and the resistance of the device 12. For any particular value of source potential, then the current flowing in the circuit is proportional to the resistance of the device 12, the resistance of the glow tube 13 being sufficiently small in comparison to be ignored without affecting the outcome. Current passing through the glow tube 13 causes disturbance of the gas molecules with which the tube is filled, and light is emitted. At currents which are below the turn-on threshold of the tube, the amount of light emitted is very small, but is sufficient to be detected by the photocell 15. The current passing through the photocell 15 is measured by the meter 17.

The normal operation of a glow tube requires the application of a potential to the tube sufficient to overcome the threshold current. When this occurs, the gas in the tube is ionized to an extent such that each ion strikes molecules of gas and creates additional ions in turn. When more ions are created by collision than are reformed, the resistance of the tube 13 drops sharply, and the current flowing through the tube increases. There is then a tendency for the voltage drop across the tube to remain constant, but the resistance of the tube varies to accommodate more or less current as the total circuit resistance varies. In the device of this invention, however, the amount of current flowing through the tube 13 is below the threshold value of the tube, the resistance of the tube is high and relatively constant. Therefore, in the so-called "dark-current" region of the tube operation, the resistance of the tube 13 does not change and does not adversely effect the circuit operation. Although the tube 13 is operating in what is usually considered the current flow region when the tube is dark, as a matter of fact, light is emitted. And the amount of light being emitted in this type of operation is generally proportional to the current flowing through the tube. Therefore, what the photocell 15 responds to is essentially an actinic value which is proportional to the current flowing through device 12 being tested, and, in turn, proportional to the resistance of the device being tested. A light-tight housing 14 must surround both the tube 13 and the photocell 15 for two reasons. The obvious reason is that the incidental light will effect the reading of the meter 18 and give false answers. In addition, external light falling upon the gas in the tube 13 tends to ionize the gas, and improperly lower the resistance of the tube. Therefore, correction for even a small amount of incidental light in the system is quite complex and difficult to achieve. To improve the response of the system, the interior of the housing 14 is made highly reflective so that the photocell 15 receives as much of an input as possible. For a small change in the resistance of the device 12 being tested, there is a larger change in the amount of light being emitted by the glow tube 13. In addition, the photocell 15, which is of the photoresistive type, responds to the changes in the light emission of the tube 13 by changes in its resistance, the changes in resistance of the photocell 15 often being greater than the changes in the light emitted by the tube 13. Thus, in effect, the system of FIG. 1 amplifies changes in the values of resistance of the device 12 being tested. Since the testing and the measuring portions of the system of FIG. 1 are not electrically connected, the meter circuit is isolated from the device 12 being tested. This means that the only loading on the device 12 is the glow tube 13. Since the molecules of gas filling the tube 13 are excited by very small values of current flowing therethrough, extremely high values of resistance may be measured without resorting to sources 11 of high voltage. However, if high voltages are used to test the device 12, the isolation of the measuring portion of the system provides a greater safeguard for the operator.

Figure 2:
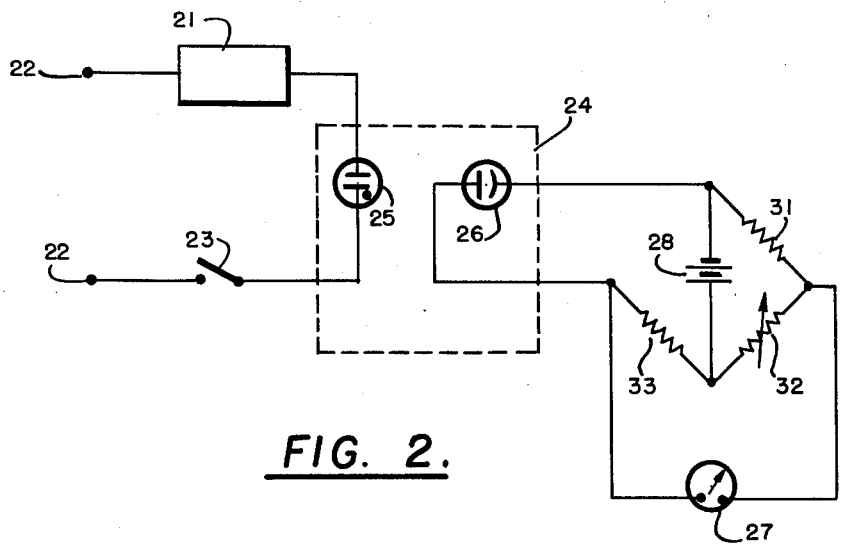
FIG. 2 is a schematic circuit diagram of a modified embodiment of the invention of FIG. 1.

FIG. 2 illustrates a modification of the system of FIG. 1 wherein a pair of terminals 22 are provided for connection to a source of electrical energy. A device 21 being tested is connected in series with a gas-filled glow tube 25, a power switch 23 and the terminals 22. The glow tube 25 is mounted within a light-tight housing 24 together with a photoresistive cell 26. The cell 26 is connected as one arm of a bridge circuit which further comprises a resistor 31 which has one end connected to one side of the cell 26 and the other end connected to a potentiometer 32. The other side of the potentiometer 32 is connected to one end of a resistor 33 whose other end is connected to the other side of the cell 26. A source of direct current such as battery 28 is connected across one diagonal, and a meter 27 is connected across the other diagonal of the bridge.

The operation of the system of FIG. 2 is the same as that of FIG. 1 except that a bridge circuit is used to measure the impedance of the cell 26 rather than a meter directly connected thereacross. When the terminals 22 are energized with either D.C. or A.C., current flows through the device 21 and the tube 25. The molecules of the gas filling tube 25 are excited by the flow of current and emit light in amounts which are proportional to the current flowing. The housing 24 is light-tight and internally highly reflective so that the light emitted by the tube 25 impinges upon the photocell 26 to modify its resistance. As the resistance of the cell 26 changes, the balance of the bridge also changes, and current begins flowing through the meter 27 from the battery 28. The potentiometer 32 is provided to initially balance the bridge so as to compensate for any slight changes in the circuit before the switch 23 is closed.

As mentioned above, either direct current or alternating current may be used to energize the device being tested and the glow tube. Since the measuring circuit is isolated from the testing circuit in both embodiments, high potentials can be used for test purposes without seriously endangering the operator. The isolation of the measuring portion of the system from the testing portion also reduces the effects of noise and of hum in the meter circuit.

This specification has described a new and improved ohmmeter for measuring a wide range of resistance values quickly, accurately and safely. It is realized that a reading of the above specification may indicate to those skilled in the art other forms which the invention may assume without departing from its spirit. It is, therefore, intended that this invention will be limited only by the scope of the appended claims.

What is claimed is:

1. An extended range electrical test instrument comprising a light-tight housing, a gas-filled glow tube situated wtihin said housing, said glow tube including a pair of spaced electrodes within said tube, a photoelectric cell positioned within said housing to receive light generated by said glow tube, the output from said cell being proportional to the amount of light received thereby, means connected to said cell to indicate the output from said cell, a source of electrical energy, the potential of said source being below the ignition threshold of said glow tube, and means for connecting said source and said electrodes of said glow tube in series with an electrical component to be tested whereby the current flowing through said glow tube is the same current which flows through the component being tested.

2. Apparatus for measuring the electrical resistance of electrical devices, said apparatus comprising a gas-filled tube, said tube having an envelope containing a pair of spaced electrodes and filled with an inert gas, means for connecting said pair of electrodes in series with the device whose resistance is to be measured and a source of electrical energy, the source of electrical energy having an output potential less than that necessary to fire said gas-filled tube, a light tight housing surrounding said gas-filled tube, a photo-resistive element within said housing in light receiving relation with said gas-filled tube, and means for measuring the resistance of said photo-resistive element to indicate the resistance of the device whose resistance is to be measured.

References Cited in the file of this patent

UNITED STATES PATENTS

| | | |
|---|---|---|
| 2,038,277 | Gent | Apr. 21, 1936 |
| 2,081,839 | Rankin | May 25, 1937 |
| 2,302,874 | Lion | Nov. 24, 1942 |